(12) United States Patent
Hu et al.

(10) Patent No.: US 8,399,117 B2
(45) Date of Patent: Mar. 19, 2013

(54) APPARATUS AND METHODS FOR BATTERY INSTALLATION

(75) Inventors: Chih-Tsung Hu, Xizhi (TW); Hao-Ming Chen, Linkou Township, Taipei County (TW)

(73) Assignee: Dell Products, L.P., Round Rock, TX (US)

( * ) Notice: Subject to any disclaimer, the term of this patent is extended or adjusted under 35 U.S.C. 154(b) by 835 days.

(21) Appl. No.: 12/456,878

(22) Filed: Jun. 24, 2009

(65) Prior Publication Data
US 2010/0330400 A1   Dec. 30, 2010

(51) Int. Cl.
*H01M 2/10* (2006.01)
(52) U.S. Cl. .......................................... 429/96; 429/100
(58) Field of Classification Search .............. 429/96–100, 429/50
See application file for complete search history.

(56) References Cited

U.S. PATENT DOCUMENTS

| 6,517,129 B1 * | 2/2003 | Chien et al. ................. 292/251.5 |
| 6,574,096 B1 | 6/2003 | Difonzo et al. |
| 7,318,731 B2 | 1/2008 | Lin et al. |

* cited by examiner

*Primary Examiner* — Patrick Ryan
*Assistant Examiner* — Muhammad Siddiquee
(74) *Attorney, Agent, or Firm* — O'Keefe, Egan, Peterman & Enders LLP (57) ABSTRACT

Apparatus and methods for placement of battery packs in portable information handling systems such as notebook and netbook computers. A first set of pivot features may be provided on opposing sidewalls of a battery well that interface with a corresponding set of mating pivot features provided on exterior end surfaces of a battery pack such that the battery pack may be pivoted into and out from the battery well to install or release it from the system, e.g., pivoted from the bottom of the portable information handling system in a manner that does not interfere with, or require modification to, the lid and display of the portable information handling system. A latch mechanism and battery release feature may be further provided that acts to transfer horizontal manipulation (e.g., horizontal sliding motion) of the battery release feature to a vertical latching action that acts to lift the battery pack out from the portable information handling system chassis when releasing the battery pack from the chassis.

26 Claims, 9 Drawing Sheets

APPARATUS AND METHODS FOR BATTERY INSTALLATION

FIELD OF THE INVENTION

This invention relates generally to information handling systems, and more particularly to installation of batteries in portable information handling systems.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Figure 1A:
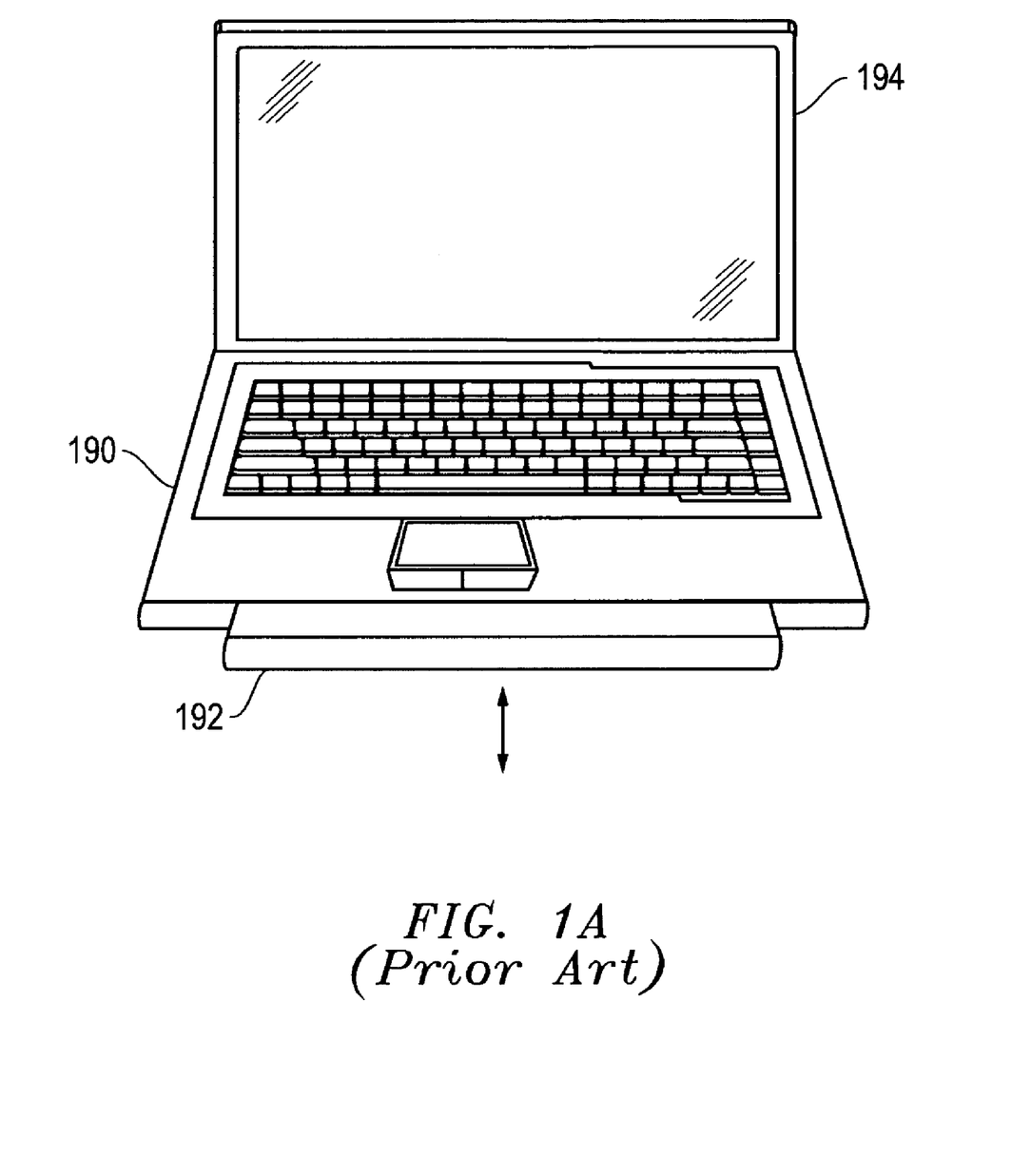
FIGS. 1A-1E illustrate battery pack placement according to the prior art.
Figure 1B:
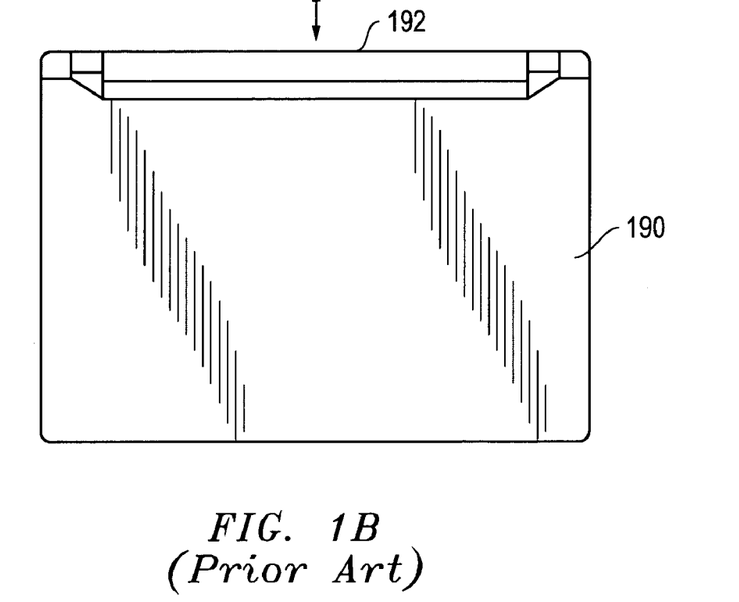
Figure 1C:
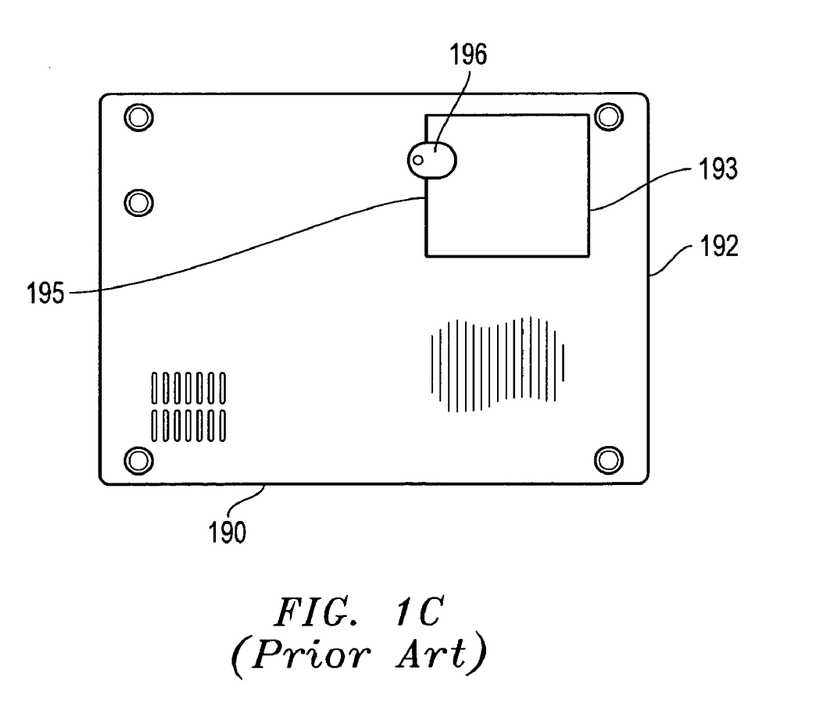

Battery pack placement for information handling systems configured as notebook computers have typically been provided in three different manners, as shown in FIGS. 1A, 1B and 1C. FIG. 1A shows front edge placement of a battery pack 192 in a notebook computer chassis 190, with removal and insertion of the battery pack 192 accomplished by sliding the battery pack either directly inward or outward (as the case may be) in one direction relative to the front edge of the notebook computer chassis 190 as shown by the arrow. FIG. 1B shows back edge placement of a battery pack 192 in a notebook computer chassis 190, with removal and insertion of the battery pack 192 accomplished by sliding the battery pack either directly inward or outward (as the case may be) in one direction relative to the rear edge of the notebook computer chassis 190 as shown by the arrow. Such sliding designs may have the characteristic of the battery pack 192 being overly loose or overly tight when placed in the chassis 190, a rocking action of the battery pack 192 within the chassis 190 may be encountered, and problems may be encountered with keeping the battery pack 192 latched within the chassis 190.

FIG. 1C shows bottom surface placement of a battery pack 192 in a notebook computer chassis 190, with insertion of the battery pack 192 accomplished by placing a first edge 193 of the battery pack 192 into a cavity defined in the bottom of the computer chassis 190 and then rotating an opposite second edge 195 of the battery pack 192 into the cavity with a locking mechanism 196 provided to contact the second edge 195 to secure the battery pack 192 within the battery cavity. Removal of the battery pack 192 of FIG. 1C is accomplished by reverse action after releasing the locking mechanism.

Figure 1D:
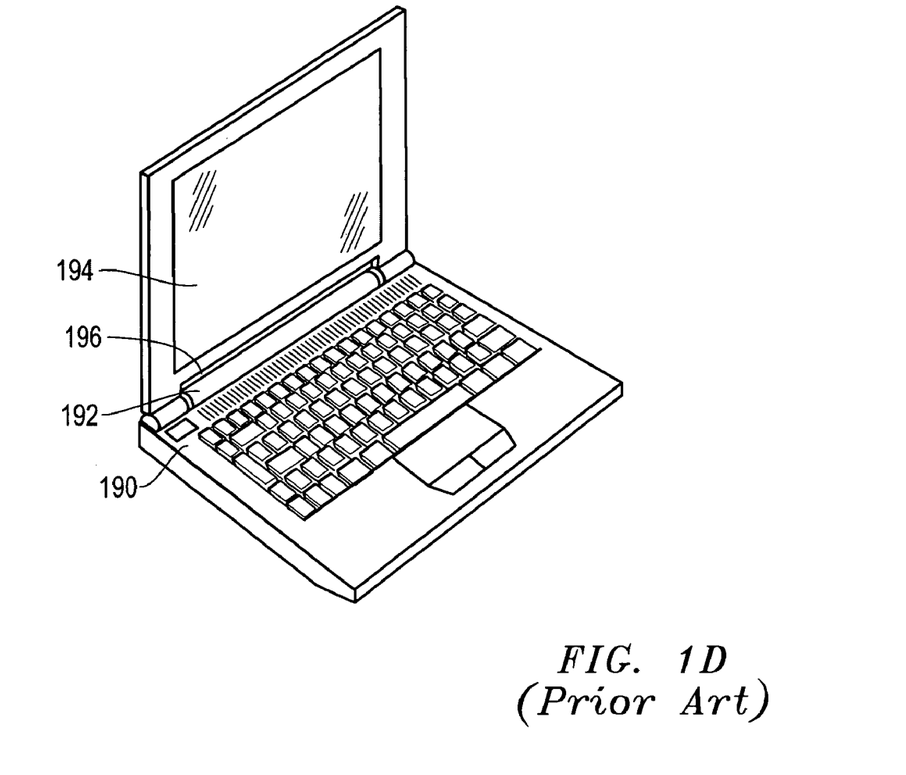
Figure 1E:
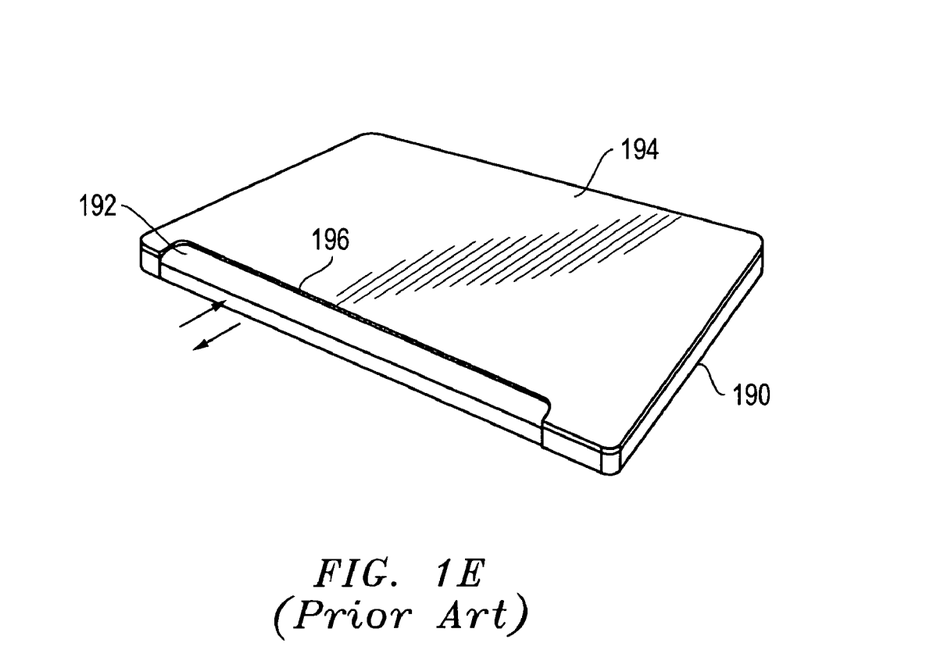

FIGS. 1D and 1E further illustrate rear edge placement of a battery pack 192 in a notebook computer chassis 190 of the prior art. As shown in FIGS. 1D and 1E, the form factor of laptop lid/display 194 is adjusted to provide an open cutout section 196 to allow clearance for the oversized top (containing battery cells) of battery pack 192 to be removed past lid/display 194 from chassis 190 by sliding outward relative to the rear edge of the notebook computer chassis 190 in the direction of the arrow in FIG. 1E. This results in a chopped or reduced display area. For relatively small notebook computers, such as netbook computers, the battery pack 192 tends to be larger relative to the size of the chassis 190, which further increases the conflict between the battery pack 192 and the lid/display 194.

SUMMARY OF THE INVENTION

Disclosed herein are apparatus and methods for placement of battery packs in portable information handling systems such as notebook and netbook computers. In one embodiment, the disclosed apparatus and methods may be advantageously implemented to meet space limitation requirements and to keep ID (i.e., "Industry Design", the function which defines the system outlook, form factor of shape and cosmetic finish) form factor by employing a unique battery installation direction together with a new battery support and latch mechanism configuration. The disclosed apparatus may be advantageously employed in one exemplary embodiment for installation and removal of oversized battery packs from relatively small notebook computers (e.g., notebook computer having a diagonal screen size of less than about 12", and having an overall notebook computer thickness of less than about 1") without the necessity of providing cutout section/s in the lid component for battery pack removal and installation clearance. However, benefit of the disclosed apparatus and methods may achieve with notebook computers or portable information handling systems having greater sizes and/or other configurations.

In one exemplary embodiment, a battery well configured to accept the outer dimensions of at least a portion of a battery pack may be defined within the chassis of a portable information handling system. A first set of pivot features may be provided on opposing sidewalls of the battery well that interface with a corresponding set of mating pivot features provided on exterior end surfaces of the battery pack such that the battery pack may be pivoted into and out from the battery well to install or release it from the system, e.g., pivoted from the bottom of the portable information handling system in a manner that does not interfere with, or require modification to, the lid and display of the portable information handling system. A latch mechanism and battery release feature may be further provided that acts to transfer horizontal manipulation (e.g., horizontal sliding motion) of the battery release feature to a vertical latching action that acts to lift the battery pack out from the portable information handling system chassis when releasing the battery pack from the chassis.

Implementation of the above-described features may provide one or more benefits including, but not limited to, allowing a user to use only one hand to unlatch and lift the battery pack from the battery well of the system while keeping the other hand free, providing good usability for a user to install and/or remove a battery pack, efficiently reducing the critical stacking height of a portable information handling system to strengthen the product competency and/or keep the ID form factor clearer than previous designs of similar portable information handling systems, enhancing the battery pack fit and retention within a portable information handling system, and increasing reliability of retention of the battery pack within the portable information handling system.

In one respect, disclosed herein is an information handling system, including: a removable battery pack having two opposing ends and a latch interface side surface formed therebetween adjacent a front end of the battery pack, the removable battery pack including a first pivot feature formed on each of the two opposing ends of the battery pack adjacent a back end of the removable battery pack and at least one latch member provided within or on the latch interface side surface of the battery pack, the latch member having at least one latching surface defined thereon. The chassis may include a chassis including a base component having a battery well defined therein, the battery well including interior sidewalls configured to at least partially receive the removable battery pack therein, and a second pivot feature provided on each of the two opposing interior sidewalls of the battery well, wherein each of the first pivot features of the removable battery pack is configured to slidingly engage a respective one of the second pivot features when the removable battery pack is in uninstalled position such that the back end of the removable battery pack is received in pivoting relationship relative to the battery well, the front end of the removable battery pack being thereafter pivotable about the back end of the removable battery pack from the uninstalled position to an installed position within the battery well. The base component may further include a latch mechanism that itself includes: a battery release feature, a motion transfer assembly coupled to the battery release feature, at least one elongated rotating cam member having first and second opposing ends and being rotatably coupled to the base component at a rotation axle point between the first and second opposing ends, the elongated rotating cam member being rotatably coupled adjacent its first end to the motion transfer assembly and having a latching post extending from a position adjacent its second end, the latching post extending in a direction that is substantially parallel to the axis of rotation of the rotation axle point. The latching post of the latch mechanism may be configured for latching interaction with the latch member of the removable battery pack when the elongated rotating cam member rotates to move the latching post into overhead latching position adjacent the latching surface of the latch member to place the removable battery pack in secure latched relationship within the battery well when the front end of the removable battery pack is pivoted about the back end of the removable battery pack from the uninstalled position to the installed position within the battery well. The latching post of the latch mechanism may also be configured to be moved to an unlatched position that is not adjacent and overhead the latching surface of the latch member by further rotation of the elongated rotating cam member such that the front end of the removable battery pack may be pivoted about the back end of the removable battery pack from the installed position within the battery well to an uninstalled position.

In another respect, disclosed herein is a method of operating an information handling system with a removable battery pack, the method including: providing a removable battery pack having two opposing ends and a latch interface side surface formed therebetween adjacent a front end of the battery pack, the removable battery pack including a first pivot feature formed on each of the two opposing ends of the battery pack adjacent a back end of the removable battery pack and at least one latch member provided within or on the latch interface side surface of the battery pack, the latch member having at least one latching surface defined thereon; providing an information handling system chassis including a base component having a battery well defined therein, the battery well including interior sidewalls configured to at least partially receive the removable battery pack therein, and a second pivot feature provided on each of the two opposing interior sidewalls of the battery well. The base component may further include a latch mechanism that itself includes: a battery release feature, a motion transfer assembly coupled to the battery release feature, at least one elongated rotating cam member having first and second opposing ends and being rotatably coupled to the base component at a rotation axle point between the first and second opposing ends, the elongated rotating cam member being rotatably coupled adjacent its first end to the motion transfer assembly and having a latching post extending from a position adjacent its second end, the latching post extending in a direction that is substantially parallel to the axis of rotation of the rotation axle point. The method may further include slidingly engaging a respective one of the second pivot features with each of the first pivot features of the removable battery pack when the removable battery pack is in uninstalled position to place the back end of the removable battery pack in pivoting relationship relative to the battery well, then pivoting the front end of the removable battery pack about the back end of the removable battery pack from the uninstalled position to an installed position within the battery well, and then rotating the elongated rotation cam member to move the latching post into overhead latching position adjacent the latching surface of the latch member and place the removable battery pack in secure latched relationship within the battery well.

In another respect, disclosed herein is an information handling system, including: a chassis including a base component having a battery well defined therein, the battery well including interior sidewalls configured to at least partially receive a removable battery pack therein, the removable battery pack having two opposing ends and a latch interface side surface formed therebetween adjacent a front end of the battery pack, the removable battery pack including a first pivot feature formed on each of the two opposing ends of the battery pack adjacent a back end of the removable battery pack and at least one latch member provided within or on the latch interface side surface of the battery pack, the latch member having at least one latching surface defined thereon. The chassis may further include a second pivot feature provided on each of the two opposing interior sidewalls of the battery well, wherein each of the second pivot features of the chassis is configured to slidingly engage a respective one of the first pivot features of the removable battery pack when the removable battery pack is in uninstalled position such that the back end of the removable battery pack is received in pivoting relationship relative to the battery well, the front end of the removable battery pack being thereafter pivotable about the back end of the removable battery pack from the uninstalled position to an installed position within the battery well. The base component may further include a latch mechanism that itself includes: a battery release feature, a motion transfer assembly coupled to the battery release feature, at least one elongated rotating cam member having first and second opposing ends and being rotatably coupled to the base component at a rotation axle point between the first and second opposing ends, the elongated rotating cam member being rotatably coupled adjacent its first end to the motion transfer assembly and having a latching post extending from a position adjacent its second end, the latching post extending in a direction that is substantially parallel to the axis of rotation of the rotation axle point. The latching post of the latch mechanism may be configured for latching interaction with the latch member of the removable battery pack when the elongated rotating cam member rotates to move the latching post into overhead latching position adjacent the latching surface of the latch member to place the removable battery pack in secure latched relationship within the battery well when the front end of the removable battery pack is pivoted about the back end of the removable battery pack from the uninstalled position to the installed position within the battery well. The latching post of the latch mechanism may also be configured to be moved to an unlatched position that is not adjacent and overhead the latching surface of the latch member by further rotation of the elongated rotating cam member such that the front end of the removable battery pack may be pivoted about the back end of the removable battery pack from the installed position within the battery well to an uninstalled position.

DESCRIPTION OF ILLUSTRATIVE EMBODIMENTS

Figure 2:
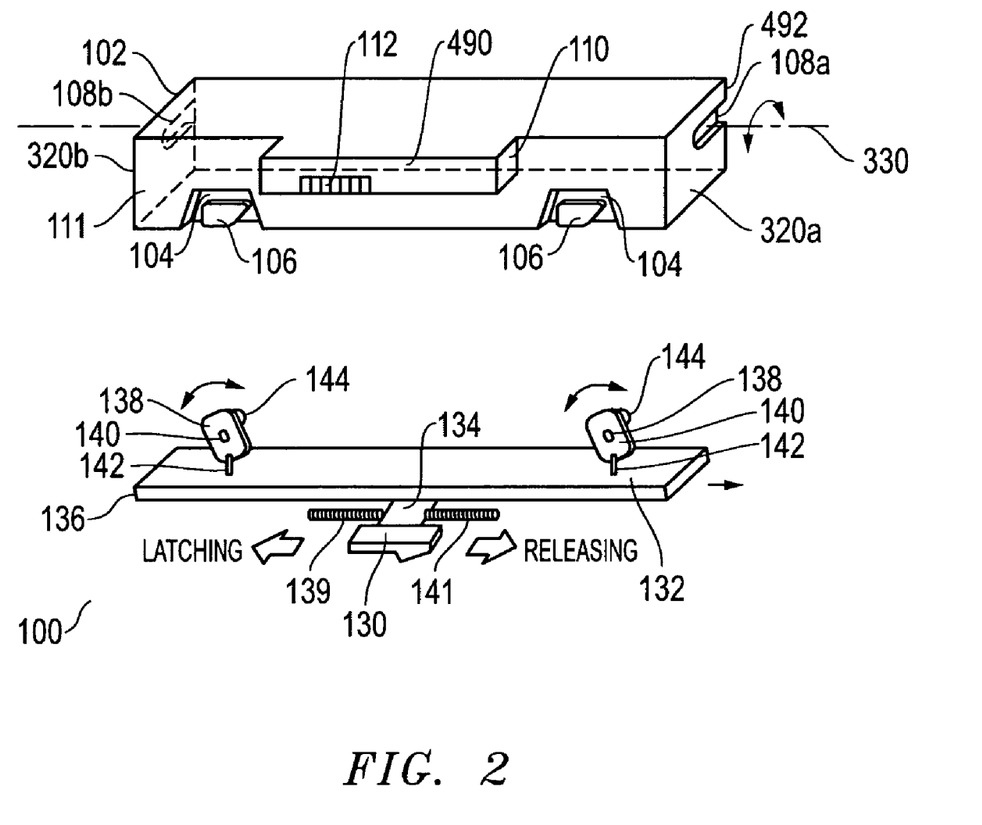
FIG. 2 is an exploded perspective view of a battery pack retention system and battery pack according to one exemplary embodiment of the disclosed apparatus and methods.

FIG. 2 is an exploded perspective view of a battery pack retention system 100 and battery pack 102 configured according to one exemplary embodiment of the disclosed apparatus and methods. As shown, battery pack retention system 100 includes a latch mechanism 136 that includes a battery release feature 130 (e.g., battery knob) that is configured for sliding manipulation by a user in the direction of the arrow shown in FIG. 2. In this exemplary embodiment, battery release feature 130 is configured to extend through and be exposed on an outer surface (e.g., bottom surface) of a portable information handling system (e.g., notebook computer) in order to provide access for a user to manipulate the battery release feature 130 in the sliding direction. As shown, battery release feature 130 is mechanically coupled to a motion transfer assembly 132 by a connection member 134 that may be dimensioned and configured as necessary to transfer sliding motion of battery release feature 130 from an outer surface of the portable information handling system to motion transfer assembly 132 which is positioned within the interior of the chassis of the portable information handling system.

Still referring to FIG. 2, latch mechanism 136 also includes two elongated rotating cam members 138 that are each configured to be rotatably coupled to the chassis of the portable information handling system at a rotation axle point 140 positioned near the center of the elongated cam member 138. Each of rotating cam members 138 is coupled to motion transfer assembly 132 by a respective linking member 142 that is fixedly coupled to motion transfer assembly 132 and rotatably coupled at a first end to its respective cam member 138 (e.g., through a rotational opening) such that lateral movement of motion transfer assembly 132 in the direction of the arrow (e.g., by a corresponding sliding movement of battery release feature 130) is translated to rotational motion of the cam members 138 in the direction of the arrows, it being understood that lateral movement of motion transfer assembly 132 in the direction opposite the arrow shown is likewise translated to rotational motion of the can members 138 in the opposite direction of the arrows. An optional return mechanism (e.g., spring assemblies 139 and 141 or any other suitable biasing mechanism such as compressible rubber material, pneumatic or electric actuator, bendable metal tang, etc.) may be provided to bias the linking member 142, motion transfer assembly 132, and the battery release feature 130 toward a neutral (e.g., latched position) as will be described further herein in relation to FIG. 5C. Each cam member 138 is further provided with an extending latching post 144 (e.g., latching rod) positioned at a second end opposite the first end.

In this exemplary embodiment, each latching post 144 of latch mechanism 136 is configured for latching interaction with a corresponding latch cavity 104 and latch member 106 of battery pack 102 as described further herein. However, it will be understood that only one cam member 138, or more than two cam members 138, may be alternatively provided for latching interaction with a like number of corresponding latch cavities 104 and latch members 106 of a battery pack 102. Further, besides a swing type assembly such as illustrated, a motion transfer assembly may be any suitable mechanism (e.g., lever, rotating shaft, etc.) for transferring movement of battery release feature 130 (e.g., sliding manipulation by a user) to rotational movement of cam members 138.

FIG. 2 shows battery pack 102 as it may be configured according to one exemplary embodiment of the disclosed apparatus and methods. In this embodiment, battery pack 102 includes an optional extended section 110 on the pivoting front end 490 of battery pack 102 that has battery electrical connectors 112 disposed on an external surface thereof for interconnection with corresponding electrical connectors of a portable information handling system chassis, it being understood that other battery pack geometries are possible and that battery electrical connectors may be provided on any other surface of battery pack 102 that is suitable for interconnection with circuitry of a portable information handling system. In a longitudinal position between pivot features 108a and 108b, battery pack 102 is also provided on a latch interface side surface 111 with latch cavities 104 that each partially surround a corresponding latch member 106, with each of the latch cavities 104 and its corresponding latch member 106 configured to interact with a respective latching post 144 of latch mechanism 136 as will be described further herein in relation to FIGS. 5A-5F. It will be understood that in another embodiment, only a latch member may be provided (i.e., with no latch cavity 104) such that the latch member extends directly outward from the latch interface side surface 111 of the battery pack 102 for latching interaction with the latch post 144.

Figure 3:
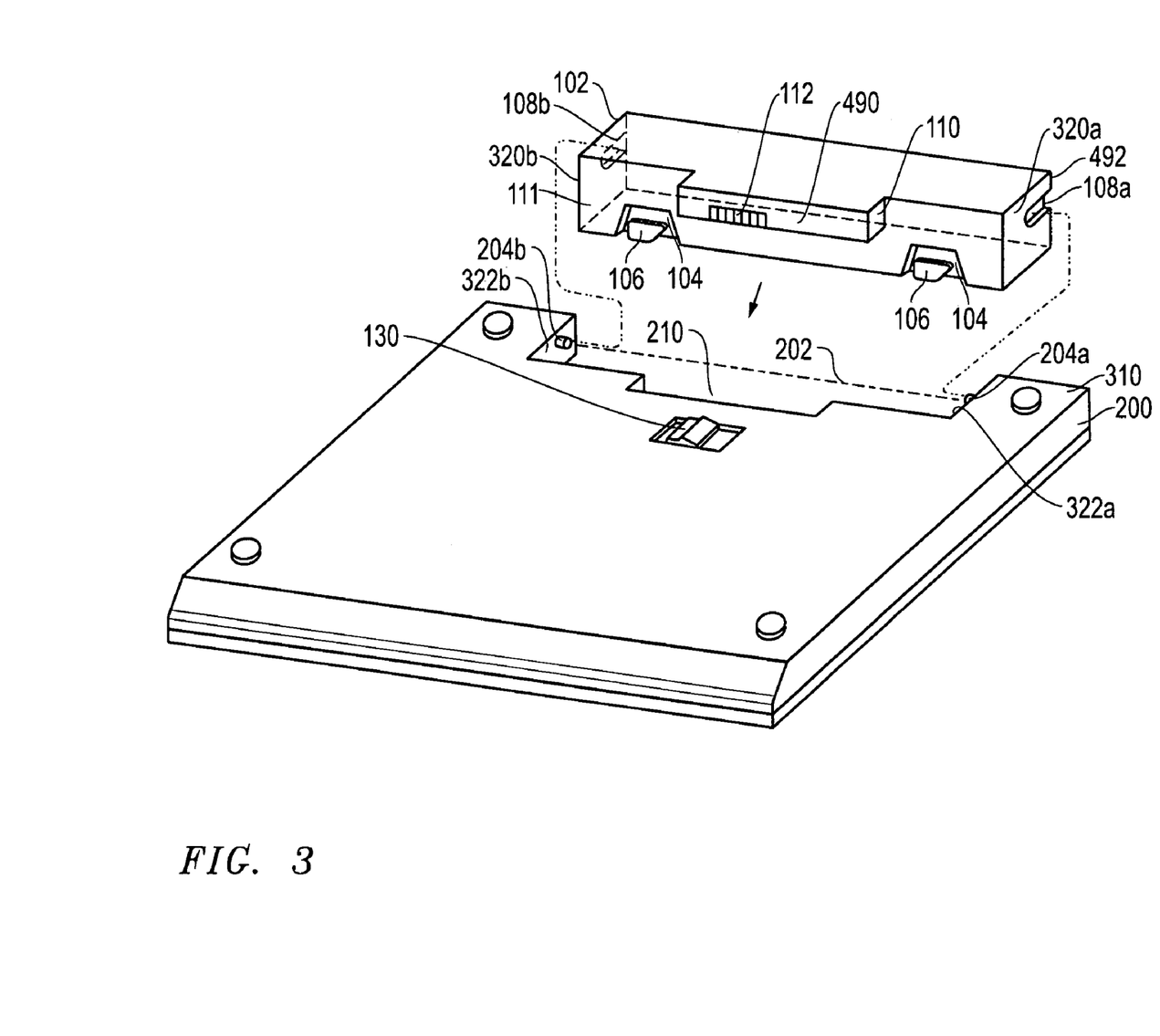
FIG. 3 illustrates a battery pack in relation to a battery well of a portable information handling system according to one exemplary embodiment of the disclosed apparatus and methods.
Figure 4:
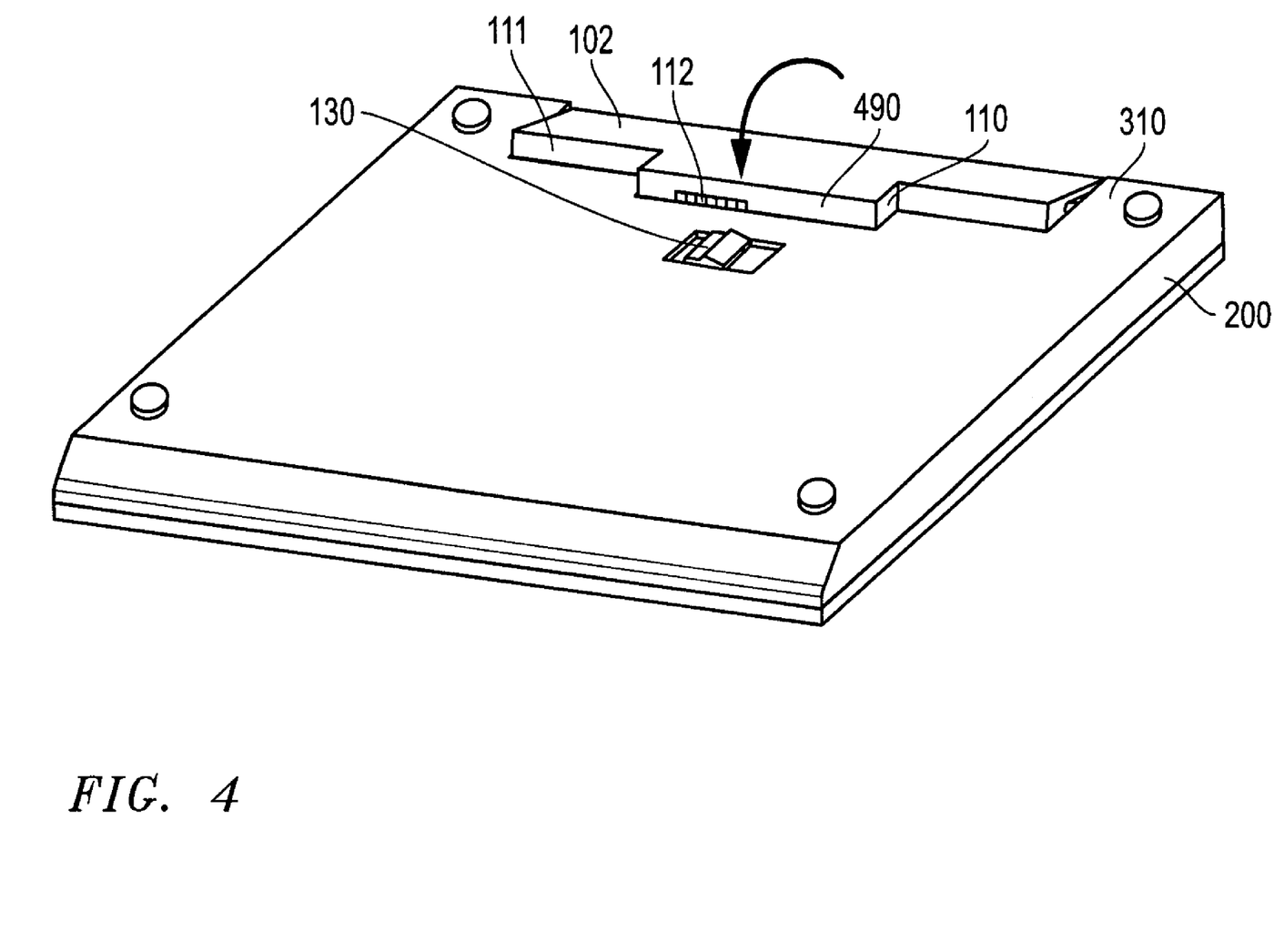
FIG. 4 illustrates a battery pack in relation to a battery well of a portable information handling system according to one exemplary embodiment of the disclosed apparatus and methods.

FIG. 3 illustrates battery pack 102 in relation to a battery well 202 defined in the bottom surface 310 of a portable information handling system chassis 200 that is dimensioned and shaped complementary to battery pack 102 such that battery pack 102 may be pivotably inserted into battery well 202 to place it in secure latched relationship (i.e., in installed position relative to battery well 202) with chassis 200 as shown in FIG. 4. As further shown in FIGS. 2 and 3, a pivot feature 108a is provided in the form of a pivot insertion channel defined in end surface 320a of battery pack 102 adjacent and contiguous with surface on back end 492 of battery pack 102. A corresponding mating pivot feature 204a as shown in FIG. 3 is provided in the form of a pivot post that extends from the interior side wall surface 322a of battery well 202, and is configured to be inserted and slidingly received within the insertion channel of pivot feature 108a when battery pack 102 is in an uninstalled position relative to battery well 202. A similar pivot feature 108b (visible in hidden outline in FIGS. 2 and 3) is provided in the form of a pivot insertion channel defined in opposite end surface 320b of battery pack 102 adjacent and contiguous with a surface of back end 492 of battery pack 102. A corresponding mating pivot feature 204b shown in FIG. 3 is provided in the form of a pivot post that extends from the interior sidewall surface 322b of battery well 202, and is configured to be inserted and slidingly received within the insertion channel of pivot feature 108b when battery pack 102 is in an uninstalled position relative to battery well 202. As shown in FIG. 2, battery pack 102 may be pivoted around pivot axis 330 extending between pivot post mating features 204a and 204b when they are received in respective corresponding channel mating features 108a and 108b.

It will be understood that corresponding mating pivot features may be provided on each of an end surface of battery pack 102 and an interior side wall surface of battery well 202 in any alternative configuration suitable for providing battery insertion and pivoting action in a manner as described herein. For example, a pivot insertion channel may be defined in each of side wall surfaces 322a and 322b of battery well 202 and a pivot post may be provided to extend from each of end surfaces 320a and 320b of battery pack 102 adjacent and contiguous with surface of back side 492 of battery pack 102, such that pivot posts extending from end surfaces 320a and 320b of battery pack 102 is configured to be inserted and slidingly received within the insertion channel defined in respective side wall surfaces 322a and 322b of battery well 202.

FIG. 4 shows battery pack 102 after back end 492 of battery pack 102 has been positioned in battery well 202 such that pivot post mating features 204a and 204b are slidingly received in respective corresponding mating insertion channel features 108a and 108b, and then front end 490 with latch interface side surface 111 of battery pack 102 are pivoted forward and around pivot post mating features 204a and 204b into battery well 202 to place battery pack 102 in secure latched relationship with chassis 200 by interrelation of latch cavities 104 and latch members 106 with respective latching posts 144 of latch mechanism 136 as will be described further herein in relation to FIGS. 5A-5F. In this regard, battery pack 102 may be pressed downward in the direction of the arrow into battery well 202 to latch the battery pack 102 into the battery well 202 of chassis 200.

Figure 5A:
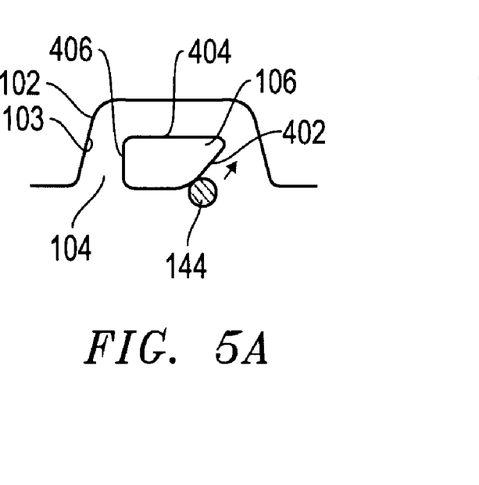
FIGS. 5A-5F illustrate interaction of a battery pack latch cavity and latch member with a respective latching post according to one exemplary embodiment of the disclosed apparatus and methods.
Figure 5B:
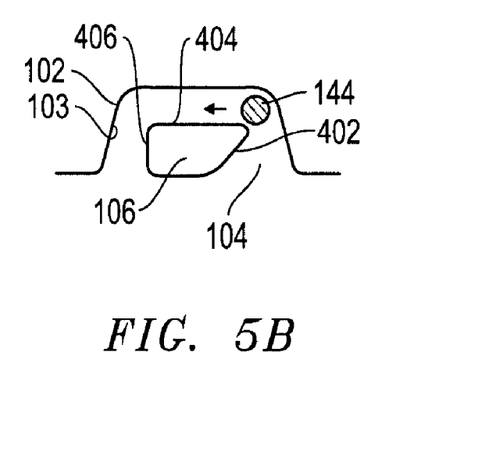
Figure 5C:
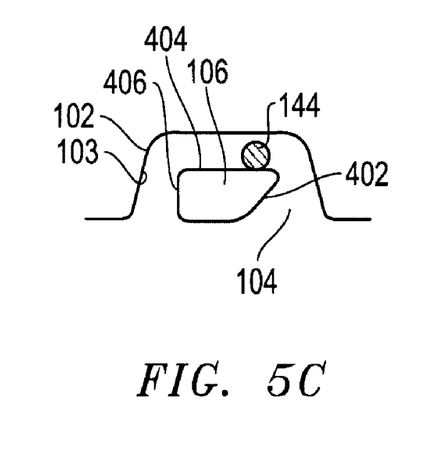

FIGS. 5A-5C illustrate partial cross-sectional views of interrelation of a respective one of latch cavities 104 and latch members 106 with a respective one of latching posts 144 of latch mechanism 136 as front end 490 with latch interface side surface 111 are pivoted forward into battery well 202 to place battery pack 102 in secure latched relationship within chassis 200 according to one exemplary embodiment of the disclosed apparatus and methods. It will be understood that each of the two latching posts illustrated in FIG. 2 operate cooperatively and in unison with simultaneous motion by virtue of interconnection by swing member motion transfer assembly 132 and respective linking members 142 during the latching operation.

As shown in FIG. 5A, during battery pack installation each respective latching post 144 is received in a respective latch cavity 104 of battery pack 102 and initially makes contact with a ramped insertion surface 402 of latch member 106 as front end 490 and latch interface side surface 111 of battery pack 102 are pivoted forward with the front end of battery pack 102 into battery well 202. Downward insertion force applied to the front end 490 of battery pack 102 (as shown by the arrow in FIG. 4) causes each respective latching post 144 to travel up ramped insertion surface 402 which in turn causes the corresponding rotating cam member 138 from which latching post 144 extends to rotate about its rotation axle point 140 in a clockwise direction about its respective rotation axle point 140 (relative to view in FIG. 2) until latching post 144 is adjacent latching surface 404 of latch member 106 as shown in FIG. 5B. Simultaneous clockwise rotation of the two cam members 138 of FIG. 2 causes motion transfer assembly 132 to move leftward (along with battery release feature 130), e.g., against the bias provided by optional return mechanism (e.g., spring assemblies 139 and 141).

When each latching post 144 reaches the position relative to latching surface 404 shown in FIG. 5B, each rotating cam member 138 reverses direction and rotates in a counter-clockwise direction about its respective rotation axle point 140 (relative to view in FIG. 2) to place latching post 144 in overhead latching position relative to and in contact with latching surface 404 as shown in FIG. 5C. Simultaneous counter-clockwise rotation of the two cam members 138 of FIG. 2 causes motion transfer assembly 132 to move rightward (along with connection member 134 and battery release feature 130). In the overhead latching position of FIG. 5C, each latching post 144 secures and latches battery pack 102 within battery well 202 with battery electrical connectors 112 connecting to corresponding electrical connectors of a portable information handling system chassis 200. In this position, latching posts 144 resist removal of battery pack 102 from battery well 202 by virtue of interference contact with latching surface 404. Further, optional spring assemblies 139 and 141 (or other suitable mechanism) may operate to maintain the latching posts 144 in the overhead latching position relative to latching surface 404.

Figure 5D:
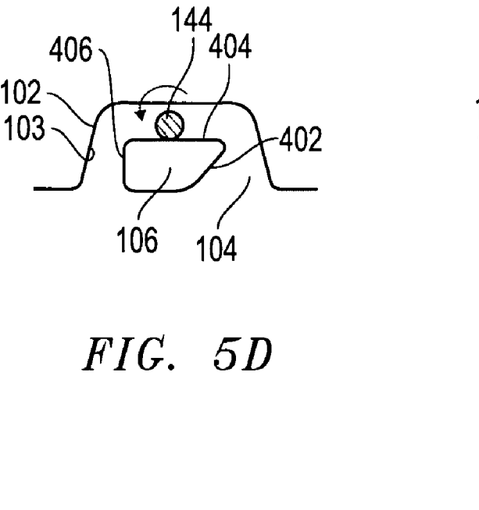
Figure 5E:
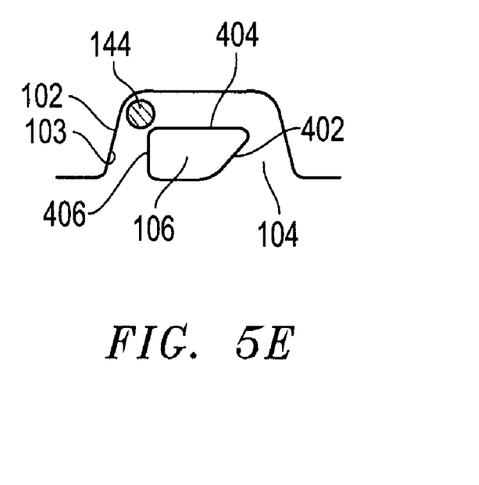
Figure 5F:
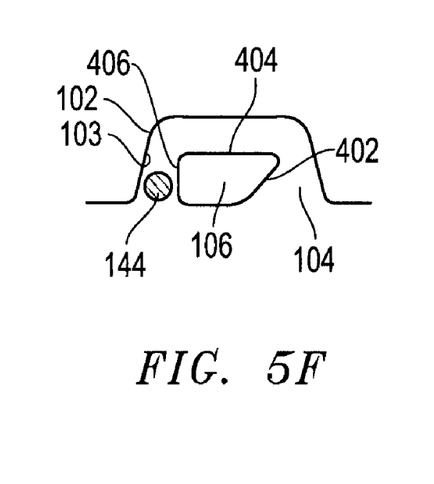

FIGS. 5D-5F illustrate partial cross-sectional views of interrelation of a respective one of latch cavities 104 and latch members 106 with a respective one of latching posts 144 of latch mechanism 136 as battery release feature 130 is manipulated (e.g., by a human finger) to release battery pack 102 from latched position within portable information handling system chassis 200 according to one exemplary embodiment of the disclosed apparatus and methods. Once again, it will be understood that each of the two latching posts illustrated in FIG. 2 operate cooperatively and in unison with simultaneous motion by virtue of interconnection by motion transfer assembly 132 and respective linking members 142 during the releasing operation.

As shown by the arrow in FIG. 5D, each respective latching post 144 is moved counter-clockwise from overhead latching position relative to and in contact with latching surface 404 to the unlatched position of FIG. 5E as battery release feature 130 is moved from left to right (relative to FIG. 2), which in turn moves connection member 134 and motion transfer assembly 132 rightward and causes simultaneous counter-clockwise rotation of the two cam members 138 of FIG. 2. Once moved to the position shown in FIG. 5E, each latching post 144 is no longer in overhead latching position relative to a respective latching surface 404, but is instead positioned between vertical removal surface 406 of its respective latch member 106 and outwardly-angled extraction wall surface 103 of its respective latch cavity 104 (which angles outward toward the open end of latch cavity 104 as shown). Further counter-clockwise motion of cam members 138 by manipulation of battery release feature 130 left to rightward causes each latching post 144 to contact and progressively ride outwardly against its respective extraction wall surface 103, which in turn acts to apply a force to pivot battery pack 102 outward from battery well 202 of chassis 200 so that it extends for easy removal from battery well 202 of chassis 200 as shown in FIG. 5F. Rightward movement of battery release feature 130 may reach a mechanical limit or stop point between position of FIGS. 5E and 5F (e.g., by contact of right end of motion transfer assembly 138 with a mechanical stop), and may spring back to neutral position by virtue of optional spring assemblies 139 and 141. It will be understood that the outward angle of extraction wall surface 103 is optional, and that benefits of the disclosed apparatus and methods may be realized by employing a non-outwardly angled surface, in which case battery pack 102 may be released for removal as cam members 138 rotate counter-clockwise without extending battery pack 102 outward from battery well 202 of chassis 200.

Figure 6A:
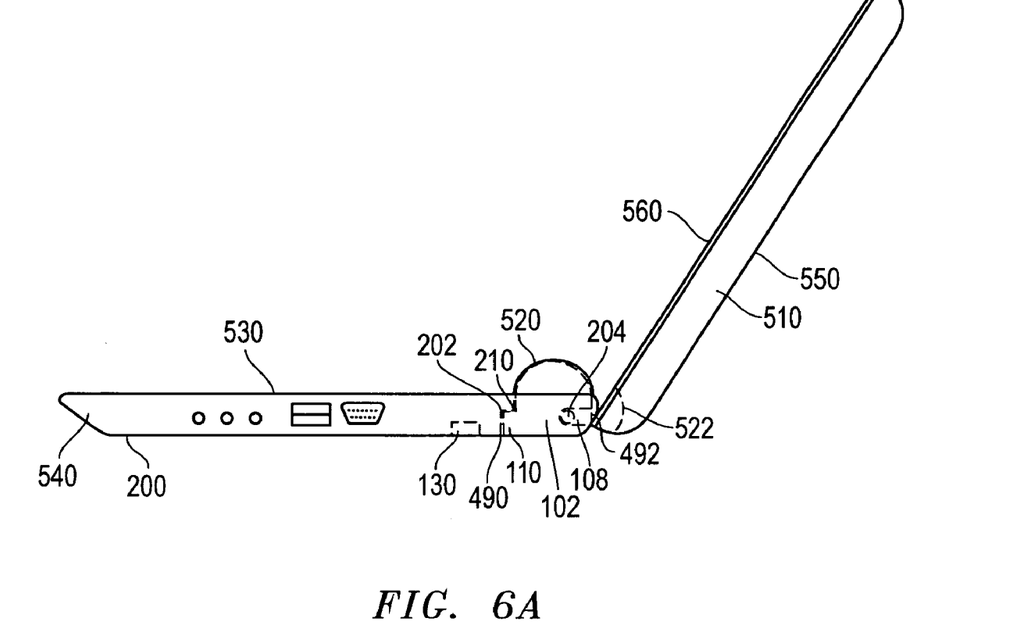
FIG. 6A illustrates a side view of a portable information handling system according to one exemplary embodiment of the disclosed apparatus and methods.
Figure 6B:
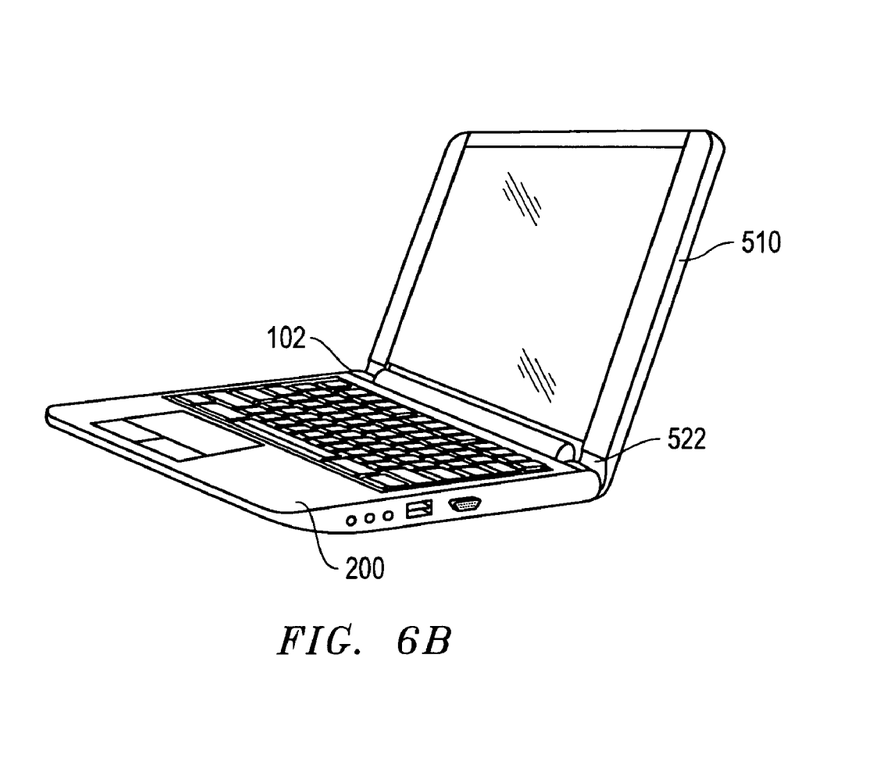
FIG. 6B illustrates a perspective view of a portable information handling system according to one exemplary embodiment of the disclosed apparatus and methods.

FIG. 6A illustrates a side view of a portable information handling system chassis 200 (e.g., notebook computer or netbook computer) according to one exemplary embodiment that is provided with a lid component 510 that includes a display (e.g., liquid crystal display system) hingeably coupled to a base component 540 that is in the opened position. As shown in FIG. 6, a battery pack 102 of the configuration described in relation to FIGS. 2-5 is received in installed position within a battery well 202 of base component 540 of chassis 200. As further shown, battery well 202 of base component 540 is provided with an interior profile 210 that is shaped and dimensioned to receive the outer profile of battery pack 102. In this exemplary embodiment, battery pack 102 has an oversized top with rounded upper surface 520 (e.g., corresponding to cylindrical battery cells provided therein) that extends through a complementary opening defined in the upper surface 530 of base component 540. Inner surface 560 of lid component 510 is provided as shown with an internal profile 522 that is shaped and dimensioned to receive upper surface 520 of battery pack 102. In this exemplary embodiment, internal profile 522 does not extend through outer surface 550 of lid component 510. Thus, since battery pack 102 is inserted and removed from chassis 200 by downward pivoting motion (see FIG. 8) rather than backwards horizontal sliding motion, a solid lid component 510 may be provided that does not require a open cutout section to allow clearance for removal of the oversized top of battery pack 102. FIG. 6B is a perspective view of portable information handling system chassis 200 of FIG. 6A, and further illustrates solid lid component 510 having internal profile 522 with no open cutout section for oversized top of battery pack 102.

Figure 7:
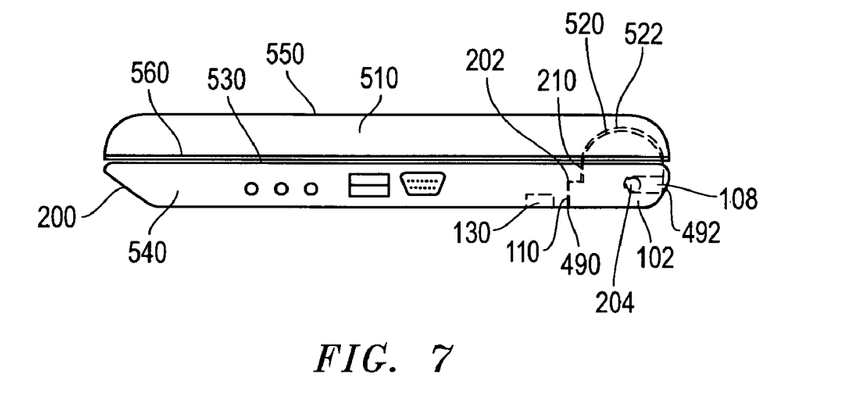
FIG. 7 illustrates a side view of a portable information handling system according to one exemplary embodiment of the disclosed apparatus and methods.

FIG. 7 shows lid component 510 of chassis 200 in closed position relationship with base component 540 having battery pack 102 in installed position within battery well 202. As may be seen in FIG. 7, internal profile 522 of lid component 510 is disposed adjacent upper surface 520 of battery pack 102 when in this position with battery pack 102 so installed.

Figure 8:
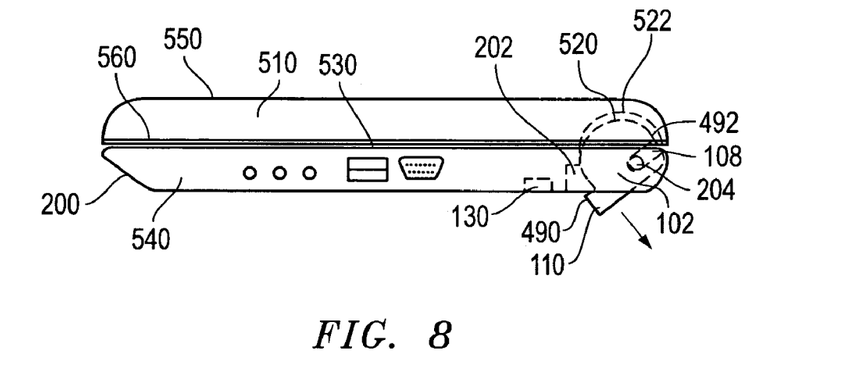
FIG. 8 illustrates a side view of a portable information handling system according to one exemplary embodiment of the disclosed apparatus and methods.
Figure 9:
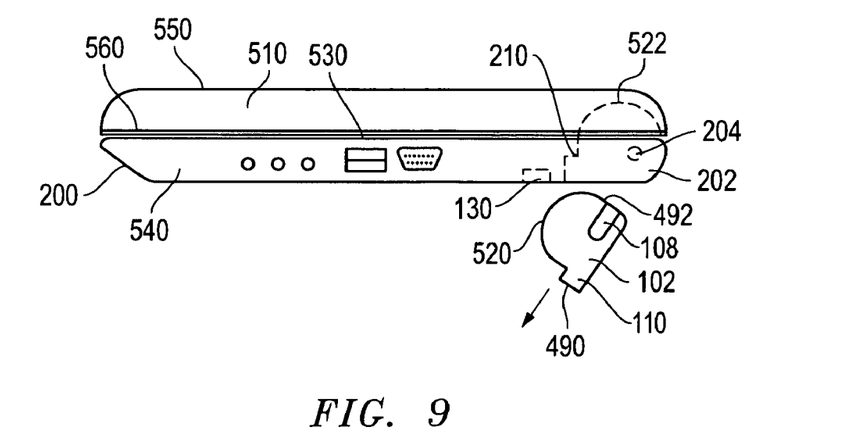
FIG. 9 illustrates a side view of a portable information handling system according to one exemplary embodiment of the disclosed apparatus and methods.

FIG. 8 shows battery pack 102 as its front end is being pivoted downward about pivot features 204 within battery well 202 in the direction of the arrow to remove battery pack 102 from installed position, after manipulation of battery release feature 130 to release latching posts 144 from overhead latching position relative to latching surface 404 of respective latching members 106 of battery pack 102. In FIG. 8, insertion channel pivot features 108 of battery pack 102 are pivoting about respective pivot post pivot features 204 as shown to move front end 490 and latching interface surface 111 of battery pack 102 out of position within interior profile 210. FIG. 9 shows battery pack 102 in uninstalled position relative to battery well 202, i.e., after removal of battery pack 102 from battery well 202 by outward sliding motion to withdraw insertion channel pivot features 108 of back end 492 from engagement with respective pivot post pivot features 204 as shown.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed apparatus and methods may be utilized in various combinations and/or independently. Thus the invention is not limited to only those combinations shown herein, but rather may include other combinations.

What is claimed is:

1. An information handling system, comprising:
   a removable battery pack having two opposing ends and a latch interface side surface formed therebetween adjacent a front end of the battery pack, the removable battery pack including a first pivot feature formed on each of the two opposing ends of the battery pack adjacent a back end of the removable battery pack and at least one latch member provided within or on the latch interface side surface of the battery pack, the latch member having at least one latching surface defined thereon;
   a chassis including a base component having a battery well defined therein, the battery well including interior sidewalls configured to at least partially receive the removable battery pack therein, and a second pivot feature provided on each of the two opposing interior sidewalls of the battery well, wherein each of the first pivot features of the removable battery pack is configured to slidingly engage a respective one of the second pivot features when the removable battery pack is in uninstalled position such that the back end of the removable battery pack is received in pivoting relationship relative to the battery well, the front end of the removable battery pack being thereafter pivotable about the back end of the removable battery pack from the uninstalled position to an installed position within the battery well;

wherein the base component further comprises a latch mechanism that itself includes:

a battery release feature, a motion transfer assembly coupled to the battery release feature, at least one elongated rotating cam member having first and second opposing ends and being rotatably coupled to the base component at a rotation axle point between the first and second opposing ends, the elongated rotating cam member being rotatably coupled adjacent its first end to the motion transfer assembly and having a latching post extending from a position adjacent its second end, the latching post extending in a direction that is substantially parallel to the axis of rotation of the rotation axle point;

wherein the latching post of the latch mechanism is configured for latching interaction with the latch member of the removable battery pack when the elongated rotating cam member rotates to move the latching post into overhead latching position adjacent the latching surface of the latch member to place the removable battery pack in secure latched relationship within the battery well when the front end of the removable battery pack is pivoted about the back end of the removable battery pack from the uninstalled position to the installed position within the battery well; and wherein the latching post of the latch mechanism is configured to be moved to an unlatched position that is not adjacent and overhead the latching surface of the latch member by further rotation of the elongated rotating cam member such that the front end of the removable battery pack may be pivoted about the back end of the removable battery pack from the installed position within the battery well to an uninstalled position.

2. The system of claim 1, further comprising a battery release feature coupled to actuate the motion transfer assembly to cause rotation of the elongated rotating cam member and movement of the latching post into and out from overhead latching position adjacent the latching surface of the latch member.

3. The system of claim 2, further comprising a return mechanism coupled to bias the motion transfer assembly to a position in which elongated rotating cam member positions latching post in overhead latching position adjacent the latching surface of the latch member.

4. The system of claim 3, wherein the latching member has at least one ramped insertion surface defined thereon adjacent the latching surface; wherein the latching post makes contact with the ramped insertion surface of latch member as the front end of the removable battery pack is pivoted about the back end of the removable battery pack from the uninstalled position to the installed position within the battery well; and wherein insertion force applied to the front end of the battery pack during the pivoting of the front end of the removable battery pack into the battery well acts to cause the latching post to be displaced by contact with the ramped insertion surface and in turn causes the rotating cam member to rotate about its rotation axle point to cause the motion transfer assembly to be moved against the bias of the return mechanism until the latching post is moved adjacent the latching surface and is biased into the overhead latching position adjacent the latching surface of the latch member by the return mechanism to place the removable battery pack in secure latched relationship within the battery well.

5. The system of claim 1, further comprising at least one latch cavity partially surrounding the corresponding latch member on the latch interface side surface of the battery pack; wherein the latching post is further configured to be received within the at least one latch cavity of the removable battery pack when the elongated rotating cam member rotates to move the latching post into overhead latching position adjacent the latching surface of the latch member to place the removable battery pack in secure latched relationship within the battery well when the front end of the removable battery pack is pivoted about the back end of the removable battery pack from the uninstalled position to the installed position within the battery well.

6. The system of claim 5, wherein the at least one latch cavity has at least one outwardly-angled extraction wall surface; wherein movement of the battery release feature to actuate the motion transfer assembly causes rotation of the elongated rotating cam member to move the latching post into contact with the extraction wall surface; and wherein the contact with the extraction wall surface acts to apply a force to pivot the front end of the battery pack outward from the battery well for removal from the battery well.

7. The system of claim 1, wherein the removable battery pack has multiple latch members provided within or on the latch interface side surface of the battery pack; wherein the latch mechanism includes multiple elongated rotating cam members and latching posts, each of the rotating cam members and multiple latch posts corresponding to one of the multiple latch members of the removable battery pack; and wherein the motion transfer assembly is a swing member that acts to interconnect and cooperatively move the multiple elongated rotating cam members and latching posts in unison with simultaneous motion.

8. The system of claim 1, wherein the chassis of the portable information handling system comprises a notebook computer chassis.

9. The system of claim 8, wherein the chassis of the portable information handling system comprises a notebook computer lid component hingeably coupled to an upper side of the base component of the notebook computer chassis at a back end of the notebook computer chassis; wherein the battery well is positioned on the lower side of the notebook computer adjacent and contiguous with the back end of the notebook computer; wherein the removable battery pack has an oversized upper surface that extends through a complementary opening defined in the upper surface of the base component; wherein the lid component is provided with an internal profile shaped and dimensioned without a cutout section to receive the oversized upper surface of removable battery pack without extending through an outer upper surface of the lid component when the lid component is in closed position relative to the base component with the battery pack in installed position within the battery well.

10. An information handling system, comprising:

a chassis including a base component having a battery well defined therein, the battery well including interior sidewalls configured to at least partially receive a removable battery pack therein, the removable battery pack having two opposing ends and a latch interface side surface formed therebetween adjacent a front end of the battery pack, the removable battery pack including a first pivot feature formed on each of the two opposing ends of the battery pack adjacent a back end of the removable battery pack and at least one latch member provided within or on the latch interface side surface of the battery pack, the latch member having at least one latching surface defined thereon;

wherein the chassis further comprises a second pivot feature provided on each of the two opposing interior sidewalls of the battery well, wherein each of the second pivot features of the chassis is configured to slidingly engage a respective one of the first pivot features of the removable battery pack when the removable battery pack is in uninstalled position such that the back end of the removable battery pack is received in pivoting relationship relative to the battery well, the front end of the removable battery pack being thereafter pivotable about the back end of the removable battery pack from the uninstalled position to an installed position within the battery well;

wherein the base component further comprises a latch mechanism that itself includes:
  a battery release feature,
  a motion transfer assembly coupled to the battery release feature,
  at least one elongated rotating cam member having first and second opposing ends and being rotatably coupled to the base component at a rotation axle point between the first and second opposing ends, the elongated rotating cam member being rotatably coupled adjacent its first end to the motion transfer assembly and having a latching post extending from a position adjacent its second end, the latching post extending in a direction that is substantially parallel to the axis of rotation of the rotation axle point;

wherein the latching post of the latch mechanism is configured for latching interaction with the latch member of the removable battery pack when the elongated rotating cam member rotates to move the latching post into overhead latching position adjacent the latching surface of the latch member to place the removable battery pack in secure latched relationship within the battery well when the front end of the removable battery pack is pivoted about the back end of the removable battery pack from the uninstalled position to the installed position within the battery well; and wherein the latching post of the latch mechanism is configured to be moved to an unlatched position that is not adjacent and overhead the latching surface of the latch member by further rotation of the elongated rotating cam member such that the front end of the removable battery pack may be pivoted about the back end of the removable battery pack from the installed position within the battery well to an uninstalled position.

11. The system of claim 10, wherein the chassis of the portable information handling system comprises a notebook computer lid component hingeably coupled to an upper side of the base component of a notebook computer chassis at a back end of the notebook computer chassis; wherein the battery well is positioned on the lower side of the notebook computer adjacent and contiguous with the back end of the notebook computer; wherein the removable battery pack has an oversized upper surface that extends through a complementary opening defined in the upper surface of the base component; wherein the lid component is provided with an internal profile shaped and dimensioned without a cutout section to receive the oversized upper surface of removable battery pack without extending through an outer upper surface of the lid component when the lid component is in closed position relative to the base component with the battery pack in installed position within the battery well.

12. The system of claim 1, where when in the overhead latching position the latching post is positioned overhead the latching surface of the latch member to resist removal of the removable battery pack by virtue of interference contact between the latching post and the latching surface of the latch member.

13. The system of claim 1, where the elongated rotating cam member of the latch mechanism is configured to:
  rotate a first direction to move the latching post to one side so as to allow the latch member to pass beside the latching post when the front end of the removable battery pack is being pivoted about the back end of the removable battery pack from the uninstalled position to the installed position within the battery well, and then to rotate in a second direction that is opposite to the first direction to move the latching post into overhead latching position adjacent the latching surface of the latch member to place the removable battery pack in the secure latched relationship within the battery well; and
  then rotate in the second direction to move the latching post to one side and out of the overhead latching position adjacent the latching surface of the latch member so as to allow the latch member to pass beside the latching post when the front end of the removable battery pack is being pivoted about the back end of the removable battery pack from the installed position within the battery well to the uninstalled position.

14. The system of claim 1, when the removable battery pack is in the uninstalled position such that the back end of the removable battery pack is received in pivoting relationship relative to the battery well, the front end of the removable battery pack is thereafter pivotable about the back end of the removable battery pack from the uninstalled position to the installed position within the battery well with substantially no sliding motion of the battery pack relative to the battery well.

15. The system of claim 1, where the second pivot feature provided on each of the two opposing interior sidewalls of the battery well is a pivot post mating feature, and where the first pivot feature formed on each of the two opposing ends of the battery pack is a mating insertion channel feature; or where the second pivot feature provided on each of the two opposing interior sidewalls of the battery well is a mating insertion channel, and where the first pivot feature formed on each of the two opposing ends of the battery pack is a pivot post mating feature.

16. The system of claim 1, where the removable battery pack has at least two spaced apart latch members provided within or on the latch interface side surface of the battery pack, each of the latch members having at least one latching surface defined thereon; wherein the latch mechanism of the base component further comprises two spaced apart elongated rotating cam members that are each configured to align with a respective one of the spaced apart latch members when the removable battery pack is received is received in pivoting relationship within the battery well; where each of the rotating cam members has first and second opposing ends and is rotatably coupled to the base component at a rotation axle point between the first and second opposing ends, each of the elongated rotating cam members being rotatably coupled adjacent its first end to the motion transfer assembly and having a latching post extending from a position adjacent its second end, the latching post extending in a direction that is substantially parallel to the axis of rotation of the rotation axle point; where the respective latching post of each of the given elongated rotating cam members is configured for latching interaction with a respective one of the latch members of the removable battery pack when the elongated rotating cam member of the given latch mechanism rotates to move the latching post into overhead latching position adjacent the latching surface of the respective latch member to place the removable battery pack in secure latched relationship within the battery well when the front end of the removable battery pack is pivoted about the back end of the removable battery pack from the uninstalled position to the installed position within the battery well; and where movement of the motion transfer assembly is configured to cause simultaneous rotation of the two elongated rotating cam members such that the two respective latching posts of the two respective elongated rotating cam members operate cooperatively and in unison with simultaneous motion to simultaneously move the respective latching posts together into an overhead latching position adjacent the latching surface of the corresponding respective latch members to place the removable battery pack in the secure latched relationship within the battery well, and to simultaneously move the respective latching posts together to an unlatched position that is not adjacent and overhead the latching surface of the corresponding respective latch members such that the front end of the removable battery pack may be pivoted about the back end of the removable battery pack from the installed position within the battery well to an uninstalled position.

17. A method of operating an information handling system with a removable battery pack, the method comprising:
providing a removable battery pack having two opposing ends and a latch interface side surface formed therebetween adjacent a front end of the battery pack, the removable battery pack including a first pivot feature formed on each of the two opposing ends of the battery pack adjacent a back end of the removable battery pack and at least one latch member provided within or on the latch interface side surface of the battery pack, the latch member having at least one latching surface defined thereon;
providing an information handling system chassis including a base component having a battery well defined therein, the battery well including interior sidewalls configured to at least partially receive the removable battery pack therein, and a second pivot feature provided on each of the two opposing interior sidewalls of the battery well, wherein each of the first pivot features of the removable battery pack is configured to slidingly engage a respective one of the second pivot features when the removable battery pack is in uninstalled position such that the back end of the removable battery pack is received in pivoting relationship relative to the battery well, the front end of the removable battery pack being thereafter pivotable about the back end of the removable battery pack from the uninstalled position to an installed position within the battery well;
wherein the base component further comprises a latch mechanism that itself includes:
a battery release feature,
a motion transfer assembly coupled to the battery release feature,
at least one elongated rotating cam member having first and second opposing ends and being rotatably coupled to the base component at a rotation axle point between the first and second opposing ends, the elongated rotating cam member being rotatably coupled adjacent its first end to the motion transfer assembly and having a latching post extending from a position adjacent its second end, the latching post extending in a direction that is substantially parallel to the axis of rotation of the rotation axle point;
wherein the latching post of the latch mechanism is configured for latching interaction with the latch member of the removable battery pack when the elongated rotating cam member rotates to move the latching post into overhead latching position adjacent the latching surface of the latch member to place the removable battery pack in secure latched relationship within the battery well when the front end of the removable battery pack is pivoted about the back end of the removable battery pack from the uninstalled position to the installed position within the battery well, and
wherein the latching post of the latch mechanism is configured to be moved to an unlatched position that is not adjacent and overhead the latching surface of the latch member by further rotation of the elongated rotating cam member such that the front end of the removable battery pack may be pivoted about the back end of the removable battery pack from the installed position within the battery well to an uninstalled position; and
wherein the method further comprises:
slidingly engaging a respective one of the second pivot features with each of the first pivot features of the removable battery pack when the removable battery pack is in uninstalled position to place the back end of the removable battery pack in pivoting relationship relative to the battery well,
then pivoting the front end of the removable battery pack about the back end of the removable battery pack from the uninstalled position to an installed position within the battery well, and
then rotating the elongated rotation cam member to move the latching post into overhead latching position adjacent the latching surface of the latch member and place the removable battery pack in secure latched relationship within the battery well.

18. The method of claim 17, further comprising rotating the elongated cam member to move the latching post of the latch mechanism to an unlatched position that is not adjacent and overhead the latching surface of the latch member, and pivoting the front end of the removable battery pack about the back end of the removable battery pack from the installed position within the battery well to an uninstalled position.

19. The method of claim 17, further comprising providing and actuating a battery release feature to cause rotation of the elongated rotating cam member and to cause movement of the latching post into or out from the overhead latching position adjacent the latching surface of the latch member.

20. The method of claim 19, further comprising providing a return mechanism coupled to bias the motion transfer assembly to a position in which elongated rotating cam member positions latching post in overhead latching position adjacent the latching surface of the latch member.

21. The method of claim 20, wherein the latching member has at least one ramped insertion surface defined thereon adjacent the latching surface; and wherein the method further comprises:
pivoting the front end of the removable battery pack about the back end of the removable battery pack from the uninstalled position to the installed position within the battery well to cause the latching post to make contact with the ramped insertion surface of latch member, and applying an insertion force applied to the front end of the battery pack during while pivoting the front end of the removable battery pack into the battery well to cause the latching post to be displaced by contact with the ramped insertion surface and causing the rotating cam member to rotate about its rotation axle point to cause the motion transfer assembly to be moved against the bias of the return mechanism until the latching post is moved adjacent the latching surface and is biased into the overhead latching position adjacent the latching surface of the latch member by the return mechanism to place the removable battery pack in secure latched relationship within the battery well.

22. The method of claim 17, further comprising providing at least one latch cavity partially surrounding the corresponding latch member on the latch interface side surface of the battery pack; and wherein the method further comprises:

pivoting the front end of the removable battery pack about the back end of the removable battery pack from the uninstalled position to the installed position within the battery well; and rotating the elongated rotating cam member to move the latching post into overhead latching position adjacent the latching surface of the latch member with the latching post received within the at least one latch cavity of the removable battery pack to place the removable battery pack in secure latched relationship within the battery well.

23. The method of claim 22, wherein the at least one latch cavity has at least one outwardly-angled extraction wall surface; and wherein the method further comprises moving the battery release feature to actuate the motion transfer assembly and cause rotation of the elongated rotating cam member to move the latching post into contact with the extraction wall surface and to apply a force to the extraction wall surface to pivot the front end of the battery pack outward from the battery well for removal from the battery well.

24. The method of claim 17, wherein the removable battery pack has multiple latch members provided within or on the latch interface side surface of the battery pack; wherein the latch mechanism includes multiple elongated rotating cam members and latching posts, each of the rotating cam members and multiple latching posts corresponding to one of the multiple latch members of the removable battery pack; wherein the motion transfer assembly is a swing member that acts to mechanically interconnect the multiple rotating cam members; and wherein the method further comprises using the swing member to cooperatively move the multiple elongated rotating cam members and latching posts in unison with simultaneous motion.

25. The method of claim 17, wherein the chassis of the portable information handling system comprises a notebook computer chassis.

26. The method of claim 25, wherein the chassis of the portable information handling system comprises a notebook computer lid component hingeably coupled to an upper side of the base component of the notebook computer chassis at a back end of the notebook computer chassis; wherein the battery well is positioned on the lower side of the notebook computer adjacent and contiguous with the back end of the notebook computer; wherein the removable battery pack has an oversized upper surface that extends through a complementary opening defined in the upper surface of the base component; wherein the lid component is provided with an internal profile shaped and dimensioned without a cutout section to receive the oversized upper surface of removable battery pack without extending through an outer upper surface of the lid component when the lid component is in closed position relative to the base component with the battery pack in installed position within the battery well.

* * * * *